United States Patent [19]
Rothamel et al.

[11] Patent Number: 5,471,874
[45] Date of Patent: Dec. 5, 1995

[54] METHOD OF CORRECTING UNBALANCE ON A MOTOR VEHICLE WHEEL

[75] Inventors: Karl Rothamel, Seeheim; Ulrich Diez, Reichshof; Josef Drechsler; Eickhart Goebel, both of Pfungstadt; Lorenz Lenhardt, Griesheim; Klaus Ruehl, Grossostheim, all of Germany

[73] Assignee: Hofmann Werkstatt-Technik GmbH, Pfungstadt, Germany

[21] Appl. No.: 115,779

[22] Filed: Sep. 3, 1993

[30] Foreign Application Priority Data

Sep. 7, 1992 [DE] Germany .............. 42 29 865.2

[51] Int. Cl.⁶ ............................................. G01M 1/16
[52] U.S. Cl. ....................................... 73/462; 73/487
[58] Field of Search ............... 73/462, 468, 487, 73/1 DV; 301/5.22; 74/573 R; 340/679, 681, 686

[56] References Cited

U.S. PATENT DOCUMENTS

| | | | |
|---|---|---|---|
| 3,741,016 | 6/1973 | Hofmann | 73/462 |
| 4,193,304 | 3/1980 | Hofmann | 73/462 |

FOREIGN PATENT DOCUMENTS

| | | | |
|---|---|---|---|
| 2001972 | 7/1971 | Germany . | |
| 2639384 | 3/1977 | Germany . | |
| 2737524 | 3/1979 | Germany . | |
| 3101843 | 8/1982 | Germany . | |
| 3416261 | 11/1984 | Germany . | |
| 4122844 | 1/1993 | Germany . | |
| 2139772 | 11/1984 | United Kingdom | 73/487 |

OTHER PUBLICATIONS

Gunther Himmler; "Der Massenausgleigh in der Auswuchttechnik" Hofmann Info, vol. 6, No Date Supplied.
Hofmann Betriebsanleitung Radauswuchtmaschine geodyna 88/88m, No Date Supplied.
Hofmann news 5, imprint 09.85D, No Date Supplied.

*Primary Examiner*—Hezron E. Williams
*Assistant Examiner*—Christine K. Oda
*Attorney, Agent, or Firm*—Cushman Darby & Cushman

[57] ABSTRACT

A method of correcting unbalance on a motor vehicle wheel by means of at least one balancing weight which can be fixed to the wheel at appropriate positions ascertained by an electronic measuring apparatus during an unbalance measuring procedure involves the use of a sensing device which is coupled to the electronic measuring apparatus and which senses relevant dimensions of the wheel for storage thereof in the electronic measurement apparatus, for evaluation of the measurement values obtained in the unbalance measuring procedure.

14 Claims, 6 Drawing Sheets

METHOD OF CORRECTING UNBALANCE ON A MOTOR VEHICLE WHEEL

BACKGROUND OF THE INVENTION

One method of correcting unbalance of a wheel, such as a motor vehicle wheel, involves using one or more compensating or balancing weights. This refers, for example, to adhesive weights which can be secured to the disk or hub portion of the wheel in a suitable position, such as the rim, which position is ascertained by an electronic measuring apparatus, during an unbalance measuring procedure.

In such a method, rim or other dimensions of the wheel can be ascertained by means of a sensing device, and stored in the electronic measuring apparatus. One example of this is disclosed in German published specification (DE-AS) No. 20 01 972 or the Hofmann operating instructions for the Geodyna 88/88m wheel balancing machine, imprint 9412145-09.86. Such a procedure requires that the electronic measuring apparatus be supplied with suitable data or items of information for calculating the sizes and angular positions for balancing weights which are to be applied to the wheel in the appropriate balancing planes. In a standard balancing procedure in which balancing weights are applied to the wheel rim flange or bead portions, it is possible, as disclosed for example in German laid-open application (DE-OS) No. 27 37 524, for the nominal values of the geometrical dimensions specified on the motor vehicle wheel to be combined with a correction value. They can be input into a storage means of an electronic measuring apparatus, in order thereby to take account of the axial spacing of the center of gravity of the balancing weight, in the respective balancing plane. Reference may also be directed in this respect to German patent application No. P 41 22 844, corresponding to U.S. patent application Ser. No. 07/910,917, describing a sensing device which makes it possible to accurately ascertain the dimensions of the wheel or, more specifically, the rim portion thereof, in the balancing planes. Such data can then be input into the electronic measuring apparatus prior to carrying out the unbalance measuring operation.

SUMMARY OF THE INVENTION

An object of the present invention is to provide a method of correcting unbalance on a wheel, such as a motor vehicle wheel, and to facilitate fitting balancing weights at the balancing positions ascertained by an electronic measuring apparatus.

Another object of the present invention is to provide a method of correcting unbalance on a wheel, such as a motor vehicle wheel, which involves a simplified operating procedure that produces reliable balancing results.

A further object of the present invention is to provide a highly accurate apparatus for correcting vehicle wheel unbalance and determining proper balancing weights and their location to balance the wheel.

Still a further object of the present invention is to provide a vehicle wheel balancing apparatus which is user-friendly in operation and useful on a wide range for different wheels.

In accordance with the principles of the present invention, the foregoing and other objects are achieved by the method and apparatus in accordance with the invention as set forth herein.

In the method according to the invention involves securing one or more balancing weights, such as adhesive weights, to the wheel in given positions ascertained by an electronic measuring apparatus during an unbalance measuring procedure. During such a procedure use is made of a sensing means or sensor coupled to the electronic measuring apparatus which senses one or more dimensions of the hub portion of the wheel. Such dimension data is stored in the electronic measuring apparatus and used for evaluation of the measuring values obtained in the unbalance procedure. This allows proper balancing weights to be correctly positioned on the wheel in the balancing process. The sensor can be used before or after the unbalance measuring procedure for the above-indicated purpose of sensing one or more dimensions of the wheel is utilized. This affords a high degree of accuracy when fitting balancing weights, more especially adhesive-type weights, at the respective balancing planes which differ depending on the type of wheel being balanced and, more specifically, on the specific rim configuration thereof. In that respect, the level of accuracy attained can be increased, in particular, by virtue of the fact that, between the balancing plane, which is sensed by the sensor before or after the unbalance measuring procedure and the sensed effective balancing radius for evaluation of the measurement values in the sensing mode, on the one hand, and, on the other hand, the balancing plane which is to be ascertained for the respective balancing weight to be arranged in the correct position of the hub portion of the wheel, there exists an exact correlation, by way of the position of the balancing plane which is stored in the electronic measuring apparatus. The position of the balancing plane stored in the electronic measuring apparatus is employed in the retrieval mode for correct positioning of the balancing weight, with the sensor making use of the above-mentioned correlation in the actual balancing operation for correctly positioning the balancing weight.

It is possible to facilitate retrieval of the position of the balancing plane stored in the electronic measuring apparatus either before or after the unbalance measuring procedure is carried out. Retrieval of the balancing plane position can be effected by a procedure whereby the sensor or sensing device, which can, for example, be in the form of a sensing bar or a sensing lever, moves towards the previously measured balancing plane. Then the respective distance of the sensing tip of the sensing bar or sensing lever, or of the center of gravity of the balancing weight, which is the operative consideration in terms of compensating for unbalance, from the balancing plane which is to be ascertained again can be indicated or rendered visible or audible by means of suitable signals. In that case, the respective distance that is still present between the sensing tip of the sensor and the balancing plane that is to be ascertained again can be indicated digitally or in some other fashion. When the desired balancing plane has been retrieved, an optical or acoustic signal can indicate to the operator that the sensing means has reached the desired balancing plane.

After unbalance measuring runs have been carried out and after the results of the measuring run have been displayed, for the positioning of one or more balancing weights on the desired location or locations on the wheel, for example the rim, the sensing device, which could have, for example, the configuration described in above-mentioned German patent application No. P 41 22 844 (corresponding to U.S. application Ser. No. 07/910,917) is moved out of the rest position thereof, thereby actuating the electronic measuring apparatus of the balancing machine into its operating mode. This mode can be referred to as "retrieval of the balancing planes" (retrieval mode). The operating mode of the apparatus can be switched over by a manually actuable switch, for example, a push-button switch or a similar actuating element. The apparatus can also be switched over automatically in the course of an operating program or by virtue of a control motion of the sensing means.

In the retrieval mode, the respective distance of the sensing means such as the tip of a sensing lever, relative to the balancing plane to be retrieved, is displayed, for example, in millimeters. For that purpose, in a dynamic balancing operation, for example firstly the spacing relative to the left-hand balancing plane of the wheel can be displayed. When the sensing tip of the sensing means, or the center of gravity of a balancing weight which is held in the appropriate position in the sensor, has reached the desired balancing plane, the distance display shows zero. Such a display could also be accompanied by, for example, an acoustic or other operator indicating signal.

During movement of the plane defined by the sensing tip of the sensing means towards the other or right-hand balancing plane, when the sensing plane moves beyond a central position intermediate the two balancing planes of the wheel being balanced, the equipment provides a distance display showing the distance relative to the right-hand balancing plane. The spacing of the sensor relative to that balancing plane will then be displayed on the balancing machine. Once again, a distance display of zero and also a suitable signal can be provided to show when the right-hand balancing plane has been reached.

As soon as the respective balancing plane is reached by the sensor, or the center of gravity of the balancing weight carried by the sensing means, the wheel can be turned into the appropriate position for balancing thereof, which position can be referred to as the angular balancing position. That can be assisted by the provision of arrow-type indicators; in this respect, reference may be made to the Hofmann operating instructions for the Geodyna 88/88m wheel balancing machine, imprint 9412145-09.86.

It is also possible to precisely measure out the balancing plane and the effective diameter of a balancing weight which is to be mounted to the rim shoulder portion or in the rim portion. Such a weight is referred to as a concealed weight. For that purpose, prior to the unbalance measuring procedure, the inside dimensions or inside diameter of the hub portion of the wheel are sensed by a procedure in which a balancing weight is disposed between the sensor, or more specifically the sensing tip, the respective positioning of which is ascertained by the electronic measuring or evaluation apparatus, and the inside dimension which is to be sensed thereby. For that purpose, the balancing weight can be fitted into a holding device which is provided on the tip of the sensor. In this case the balancing weight is then used as a sensing surface. That procedure makes it easier to ascertain the optimum balancing plane. The holding device for holding the balancing weight on the sensor is put to use for measuring the optimum balancing plane and the effective diameter at which the center of gravity of the balancing weight to be fitted will be effective. In that operation, the sensor is used to position the balancing weight precisely in the balancing plane in which, during the balancing operation, the balancing weight is to be attached, for example by being glued, mechanically held in position or by another convenient attaching technique. The magnitude of the balancing weight is ascertained by virtue of the unbalance measuring procedure. It will be seen, therefor, that in the sensing operation, it is not the sensing tip of the sensing means that is used as a reference point, but rather the reference point employed is the weight attached to the holding device which then serves as a reference weight. A suitable circuit arrangement for taking account of the dimensions of the balancing weight, having regard to the effective position of the center of gravity thereof, is disclosed is German laid-open application (DE-OS) No. 27 37 524 to which reference may be directed.

For the sensed dimensions to be transferred into the storage device of the electronic measuring apparatus, the sensing means with the reference weight attached thereto can be held in the desired position for a given period of time, for example two seconds, and thereafter the sensed dimensions can be transferred into the storage device which can be indicated by a suitable signal, for example an acoustic signal. That procedure can be used for sensing and inputting into the electronic measuring apparatus not only balancing planes, which are predetermined by virtue of specific balancing procedures or weight-positioning operations, but also any balancing planes which permit optimum positioning of the balancing weights. When the situation involves a plurality of predetermined balancing procedures, for example five predetermined balancing procedures, which are predetermined in particular when balancing alloyed wheels by means of adhesive weights, it is possible to provide for optimum sensing of the appropriate balancing planes. The location to be suitably sensed is indicated by a display, as will be specifically described in connection with the balancing operation. It is also possible in this case to bring the position of the center of gravity of the balancing weight into conformity with the respective balancing plane.

By virtue of the balancing mode being identified in the above-indicated manner, the operator of the equipment is given a reference to the location to be sensed on the hub portion of the wheel, more especially in the region of the rim thereof, not only when sensing the wheel dimensions for input thereof prior to the unbalance measuring procedure, as has already been discussed above, but also in the balancing operation which is effected by fitting the balancing weights. For that purpose, a display device is connected to the electronic measuring apparatus which reproduces a rim cross-section with the respective possible balancing planes, for example in the form of weight symbols. During the sensing operation, which can be referred to as the sensing mode, a respective balancing plane which is intended for a selected balancing mode is indicated by a signal, for example by flashing of the above-mentioned weight symbol. When the sensing means has reached the indicated balancing plane on the wheel, the flashing indication stops. This gives the operator an indication regarding the balancing planes to be sensed on the wheel and more especially the rim portion thereof. It is possible to sense five separate balancing planes which have been identified by means of weight symbols. The display of the balancing plane which is to be sensed on the wheel can begin when the sensing means or sensor is moved out of its rest position. In that way, a switch can be actuated to bring the display into operation. That display may, for example, involve flashing of the corresponding symbol at the appropriate position on the image of the rim or in cross-sectional configuration, which is included in the display. The display indicates one balancing plane, by flashing of the appropriate weight. When the sensor reaches the identified balancing plane, that can be appropriately indicated, for example, by a signal, including an acoustic signal. The light display then goes out. If a dynamic balancing operation is being carried out, the second balancing plane is identified in the same fashion. For effecting dynamic balancing, the two balancing planes to be sensed are thus displayed or indicated in succession, so that there is no possibility of any confusion between them.

The procedure involved when fitting the balancing weights in the balancing mode can be considerably simplified, from the point of view of the operator, if the means used for sensing can be fixed in given sensing positions. In particular, the sensor can be fixed in position when it has reached a respective balancing plane. When the sensing tip of the sensing means is moved relative to a balancing plane by motion in an axial direction at least substantially parallel to the support spindle of the balancing machine, the sensing means can be fixed in the appropriate sensing position by blocking such movement. When the sensing tip of the sensor is moved in the axial direction by axial extension of the sensor, the sensor can be fixed in the appropriate sensing position by blocking axial extension thereof. The motion-blocking effect can be produced by means of a clamping device which can be actuated manually or which can be operated by the electronic measuring apparatus. Particularly in the retrieval mode, that considerably facilitates the operation of fitting the balancing weights, from the point of view of the operator. However, the fact that the axial movement or extension of the sensing means can be fixed can also be advantageous when measuring and storing dimensions of the wheel, in the sensing mode. The above-mentioned clamping device can be of a mechanical nature, for example in the form of a clamping screw or an eccentric which co-operates with a leaf spring, or in the form of an electromagnetic clamping device, the latter preferably being used when the clamping device is operated by the electronic measuring apparatus.

It will be noted that the greater ease of arranging the one or more balancing weights in the correct position is enjoyed not only in a dynamic balancing process but also in a static balancing process.

Further objects, features and advantages of the present invention will be apparent from the following description of a preferred embodiment.

DESCRIPTION OF THE PREFERRED EMBODIMENT

Figure 1:
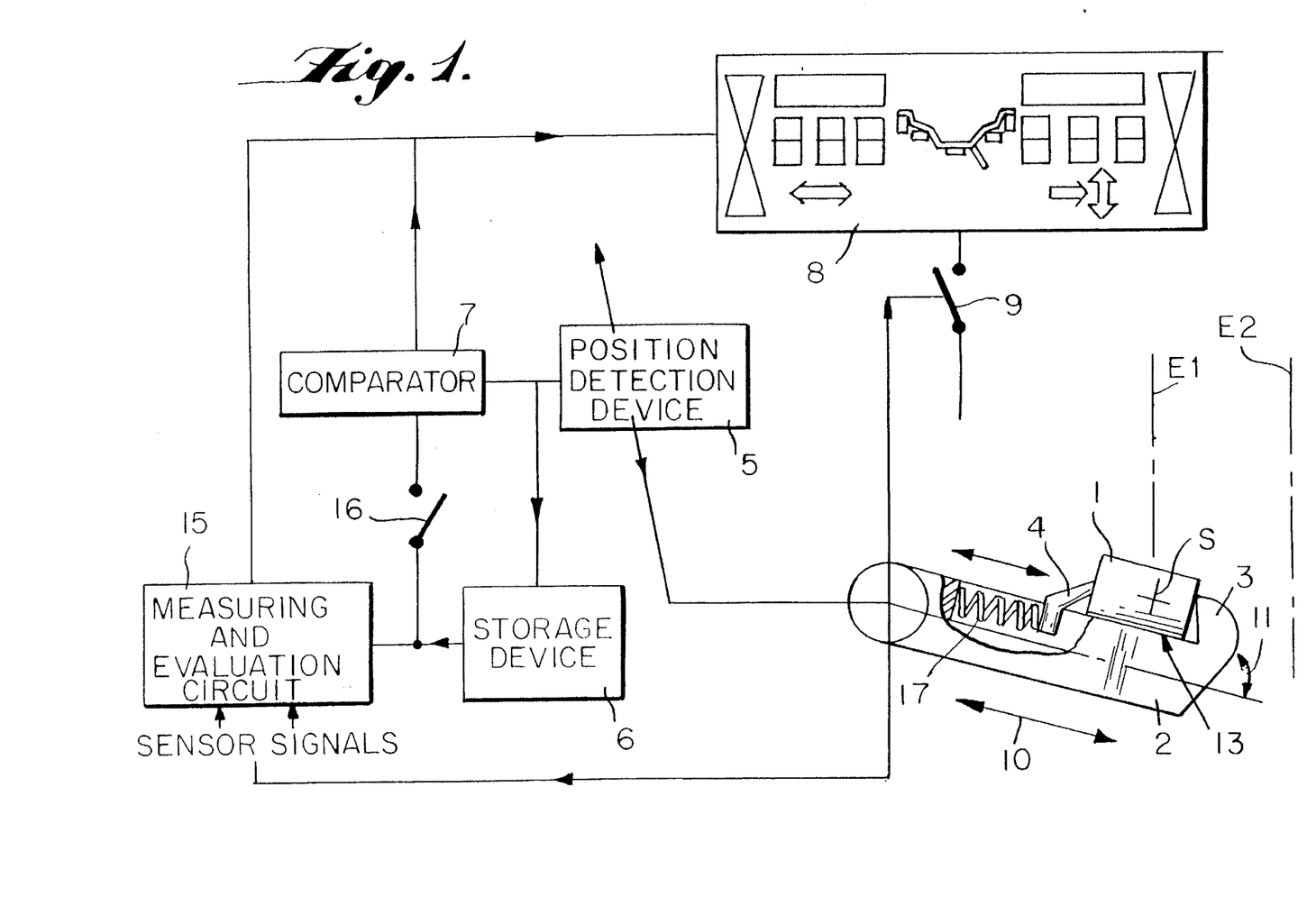
FIG. 1 shows a block circuit diagram of a diagrammatically illustrated sensing device with measuring and evaluation apparatus connected thereto.

Reference will first be made to FIG. 1 which diagrammatically shows a sensing device in the form of a sensing lever 2 with a sensing tip 3. The sensing lever 2 can be extended and retracted as indicated by the double-headed arrow 10 and also pivoted as indicated by the double-headed arrow 11. For position detection purposes, the sensing lever 2 is connected to a position detection device 5. The position detection device 5 generates electrical position detection signals which are proportional to the respective extension length changes in the direction referenced by double-headed arrow 10 of the sensing lever 2 as well as changes in the pivotal position, identified by arrow 11, of sensing lever 2. The signals which are generated by the position detection device 5 are proportional to the respective position of the sensing tip 3 of the sensing lever 2. By way of example, a detailed description of a suitable sensing device with position detection is to be found in the above-mentioned German patent application No. P 41 22 844 (corresponding to U.S. application Ser. No. 07/910,917) the disclosure of which is hereby incorporated into the present specification. The position detection device 5 may include a potentiometer for detecting changes in the pivotal position of the sensing lever 2 and a potentiometer for detecting changes in the extension length of the sensing lever 2. The analog signals produced by the potentiometers can be stored after digitization.

The illustrated sensing device can be used not only for sensing a wheel hub, more specifically in the rim region thereof, in the sensing mode, but in the retrieval mode it also serves to facilitate arranging at least one balancing weight in the correct position on the wheel after an unbalance measuring procedure has been carried out, as will be described in greater detail hereinafter.

Figure 7:
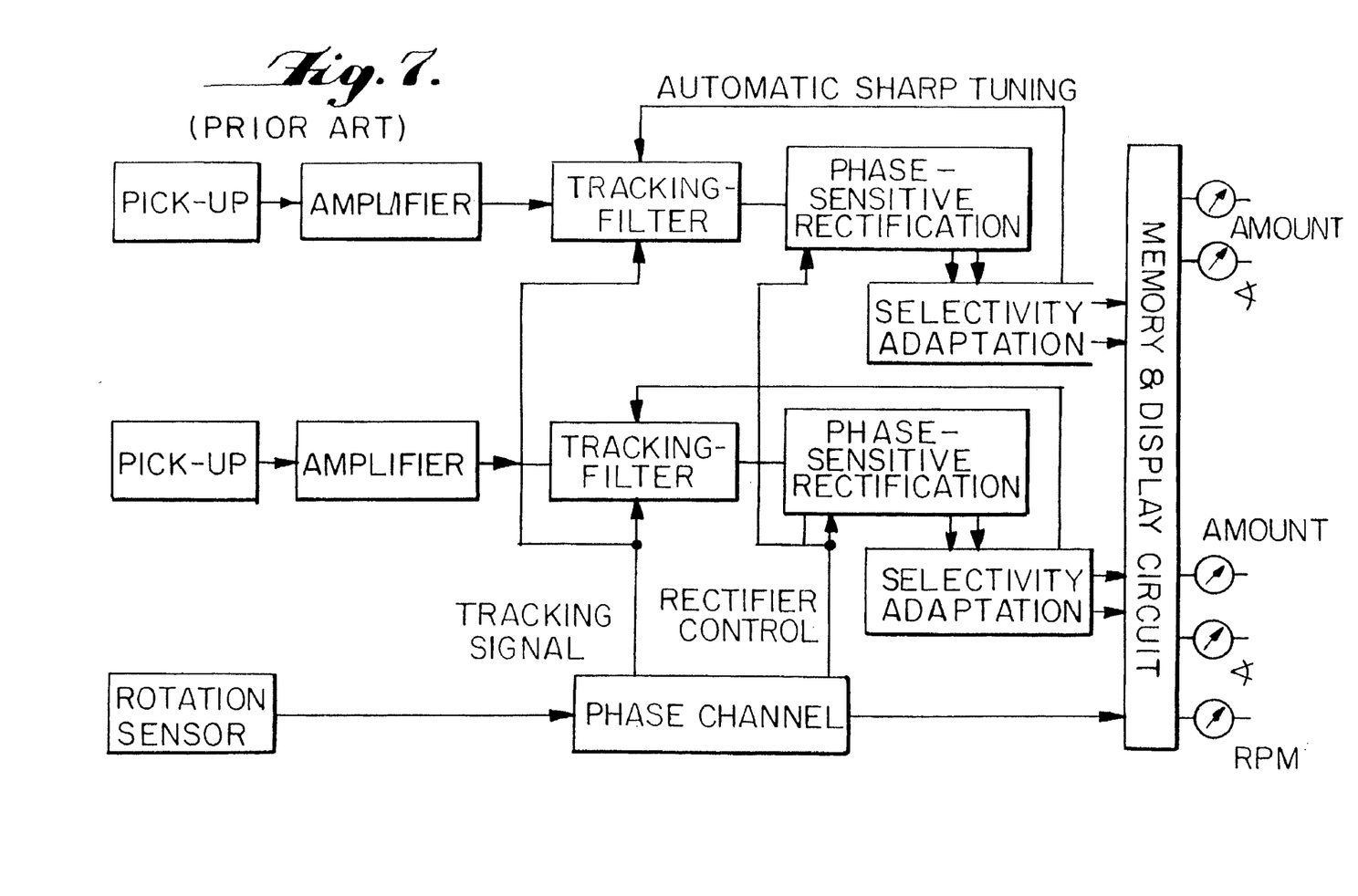
FIG. 7 is a block diagram view of a conventional auto-tracking measuring method.

For that purpose, as shown in FIG. 1, connected to the output of the position detection device 5 is a storage device or memory 6. The storage device 6 is a component of the electronic measuring and evaluation apparatus 15, a suitable form of which is described in Hofmann-news 5, imprint 09.850. Generally, two precision measuring methods are utilized in balancing machines: Auto-tracking measuring method and Digital Signal Analysis. A simplified block diagram of the Auto-Tracking measuring method is shown in FIG. 7. In the Auto-Tracking measuring method a combination of a tracking filter, which is continuously driven through the full range of the body being tested, a phase-sensitive rectification and an automatic selective adaptation of measuring time are provided.

The filter is fed back across an output signal of the rectification circuit (Automatic Frequency Control=AFC) in order to ensure amplitude and phase stability over the full speed range. This circuit combination meets highest demands regarding the quality of balance. During measurement, the selectivity of the system is ever increasing and permits a quick reading at the commencement of measuring. Disturbing effects in proximity of the frequency of unbalance can first be noticed as indication variations but are damped fast by the increase of selectivity in the course of measuring. Values can thus be read as stable and true values within the shortest time.

Figure 8:
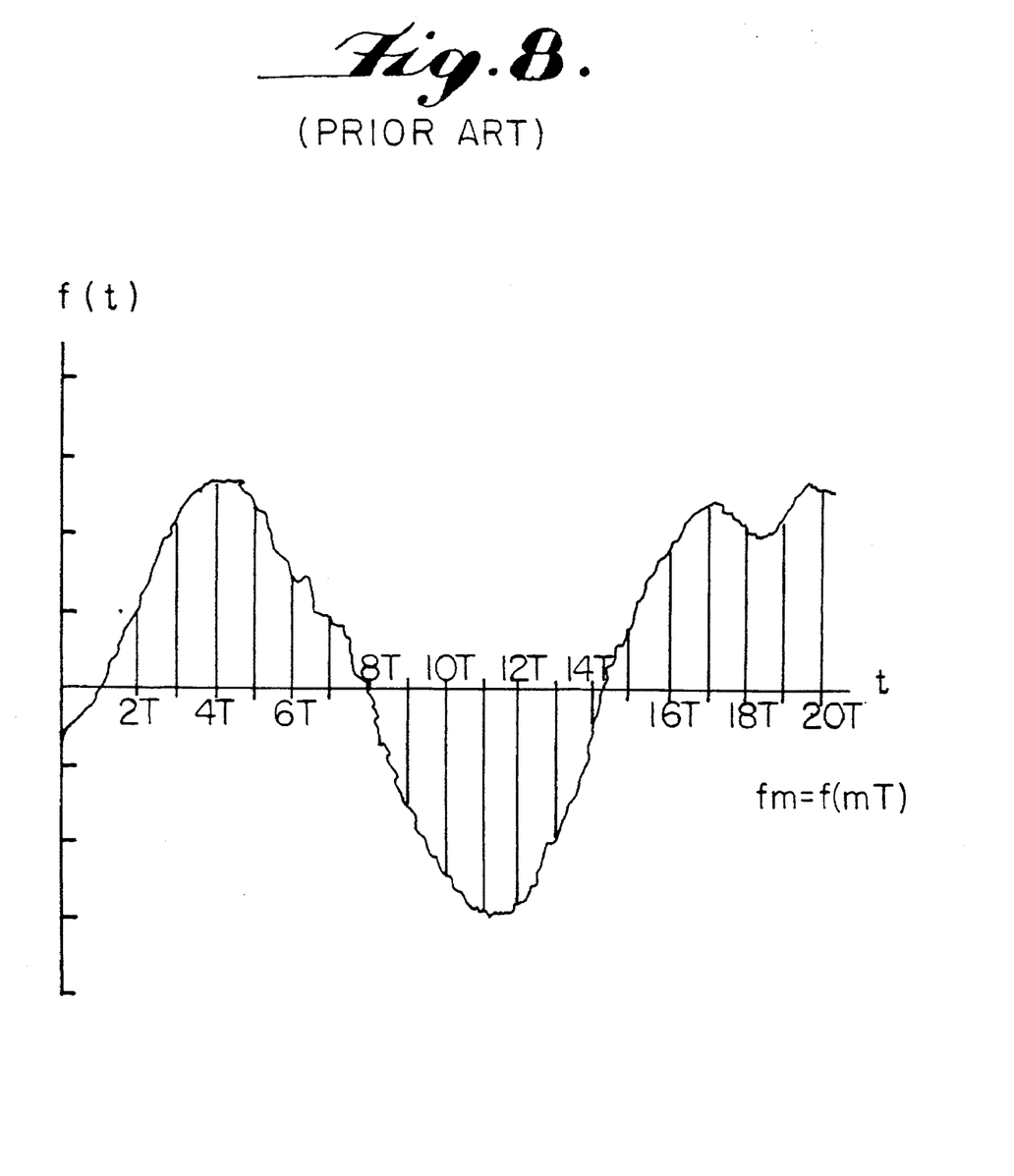
FIG. 8 is a graph of sampled continuous signals uses in digital signal analysis.

The Digital Signal Analysis system analyzes the vibration spectrum of the balancing machine resulting from the frequency at which the part is rotating. The fundamental wave which corresponds to the unbalance component, is calculated as to amount and phase and noise will thus be diminished. In contrast to analog filters, signals are not processed continuously, but, discontinuously. This action can be described as multiplication of the continuous signal by a periodic series of sampling pulses. As shown in FIG. 8, sampling series $[fm]=[f_0, f_1, f_2 \ldots]$ is derived from continuous function $f(t)$ by combining valves of $f(t)$ at times=0, 1T, 2T into a systematic series.

Figure 9:
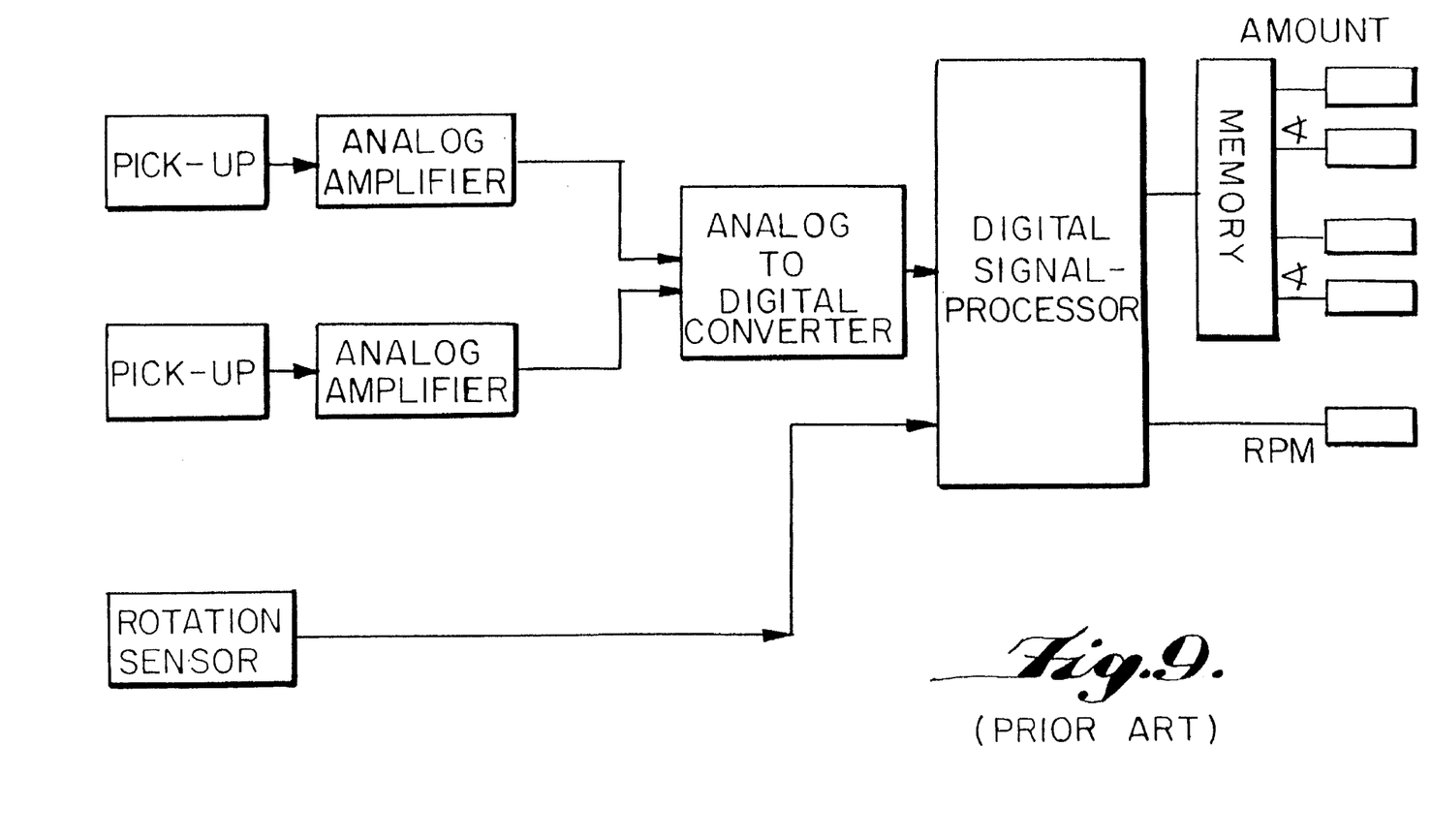
FIG. 9 is a block diagram view of a conventional data processor system for digital signal analysis.

FIG. 9 shows a simplified block diagram of a data processor system for digital analysis. The incoming analog signals from the pick-ups are converted into digital series through analog/digital converters.

Filtration of this series is achieved according to a program in the signal processor where the mean values obtained from the sampled series are multiplied after a number of periods and added separately as sine and cosine coefficients. Consequently, the processor processes the signals until being stored and indicated after the completed measuring cycle.

Due to the time linkage between the rotational frequency of the workpiece and the periodic series of the sampling pulses the filter remains tuned across the full speed range of the part under test. Amplitude and phase errors as they are known for filters of a fixed frequency will therefore not occur. The digital signal analysis too can be equipped with selective adaptation of measuring time much as the Auto-Tracking measuring method for a quick indication free from variations.

In addition to a high accuracy, both measuring methods excel also by their high overriding control of interfering signals, owing to the selective amplification.

The obtained values can further be stored indefinitely and without loss of accuracy in digital memories and transmitted to supplemental data processing such as component indication, recording systems, statistics computers, computer nets, etc. The apparatus 15 assesses and evaluates measurement sensor signals which it receives, as shown in FIG. 1, and which are obtained in the measuring runs when carrying out the unbalance measuring procedure on a wheel whose unbalance is to be ascertained. The evaluated sensor signals are then displayed in the form of information in respect of magnitude and angular position for balancing weights which are to be attached to the wheel to be balanced, the display occurring at a suitable display unit 8. Connected both to the storage device 6 and also to the position detection device 5 is a comparator 7 which is, in turn, connected to the display unit 8.

Figures 2A, 2B, 2C, 2D, 2E, 2F, 3A, 3B, 3C, 3D, 3E:
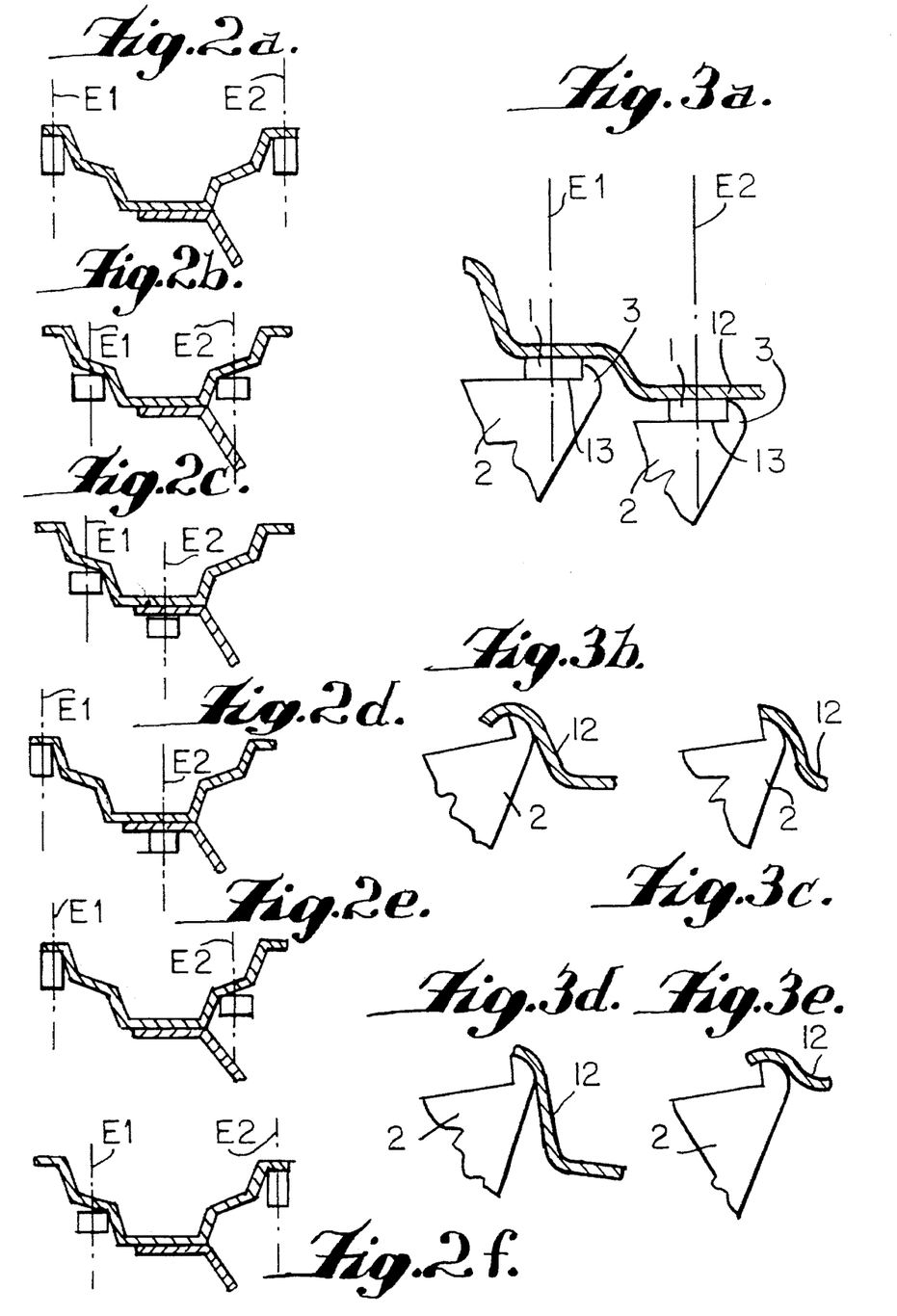
FIGS. 2A–2F show a series (a–f) of balancing modes for correcting unbalance, as can be represented by the evaluation apparatus.
FIGS. 3A–3E show various possible forms of sensing motor vehicle wheel rims.
Figure 4A:
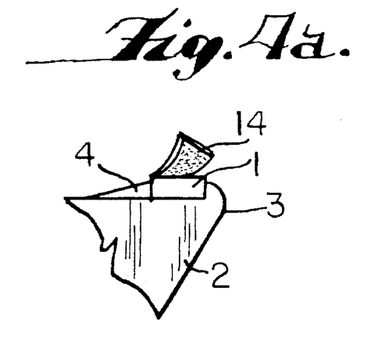
FIGS. 4A–4C are a diagrammatic view of a weight fitting operation using the sensing device.
Figure 4B:
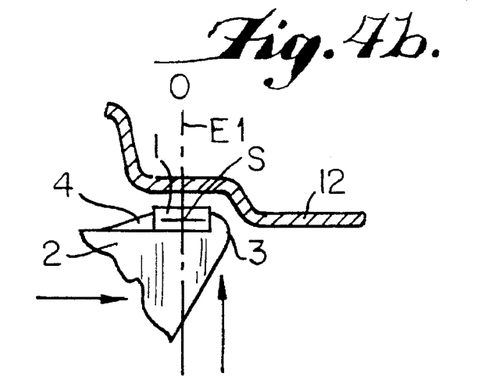
Figures 4C, 5:
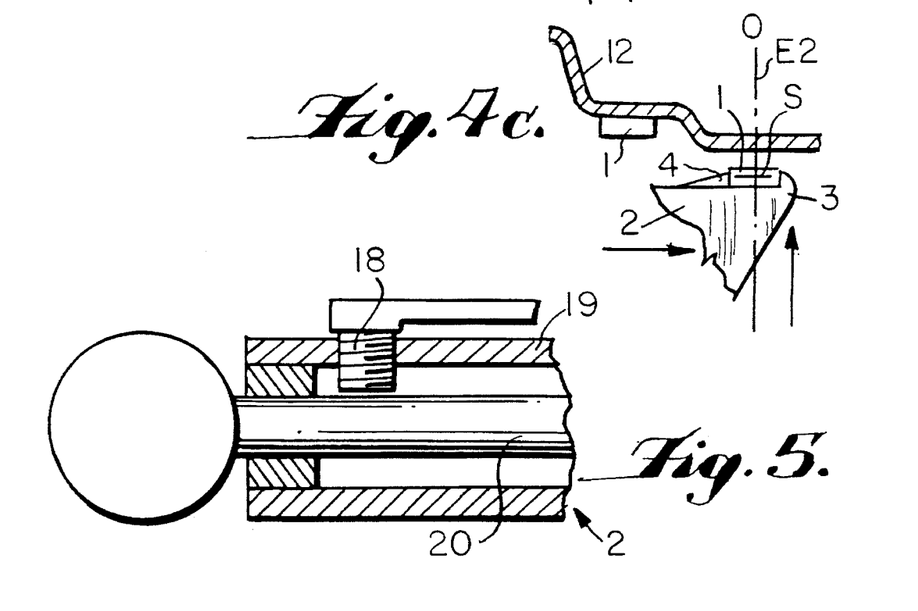
FIG. 5 is a diagrammatic view of a clamping device.
Figure 6:
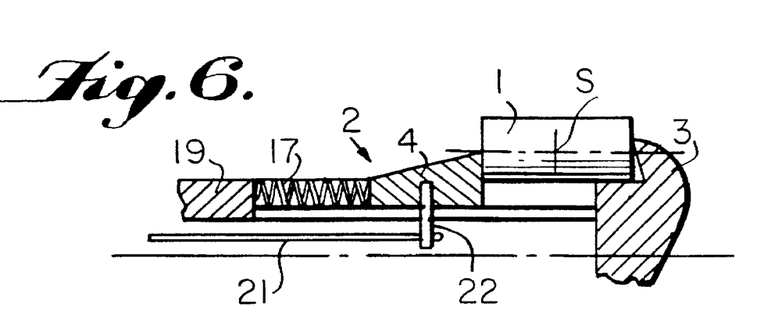
FIG. 6 shows a sensing device for sensing the weight dimensions.

As can be seen from FIGS. 1, 4 and 6, the sensing device can take the form of a sensing lever 2 that includes a weight holder 4 in the form of a gripping claw, which is subjected to the force of a coil compression spring 17 urging the weight holder 4 towards the sensing tip 3. This force holds a balancing weight 1 on the sensing lever 2 between the holder 4 and the sensing tip 3. Before an unbalance measuring procedure is carried out, the rim portion of a motor vehicle wheel to be balanced is sensed in the regions of the balancing planes diagrammatically indicated by broken lines E1 and E2 in FIG. 1 and also shown in relation to rim portions in, for example, FIG. 2. Balancing planes E1 and E2 are the planes in which at least one balancing weight is to be disposed if unbalance of the wheel is to be corrected. For example, reference may be made to FIG. 3A showing an operation of sensing a wheel rim 12 when the wheel to be balanced is, for example, a standard motor vehicle wheel with an alloy rim, to which at least one adhesive weight is to be fitted. In that respect, it must be borne in mind that the sensing tip 3 of the sensing lever 2 does not precisely coincide with the center of gravity as indicated at S of the balancing weight 1 to be attached. However, to provide for accurate balancing, the center of gravity S must be disposed in the respective balancing plane E1 or E2. In order to provide for accurate sensing here, a balancing weight 1, acting as a reference weight, is placed on sensing lever 2 and held in position thereon by means of the holder 4. The dimensions of the reference weight 1 and the position of the center of gravity thereof, in particular the distance of the center of gravity from the support edge indicated at 13 in FIG. 1 and the spacing of the center of gravity S from the sensing tip 3, are known parameters. Different dimensions in respect of the balancing weights themselves in the extension direction as indicated by the arrow 10 in FIG. 1 and displacement of the center of gravity S in that direction can be ascertained by means of a sensing device as illustrated in FIG. 6, and communicated to the position detection device 5. The above-indicated dimensions and parameters are to be taken into consideration in the position detection device 5, in order to provide for correct positioning of a balancing weight to be fitted in a respective plane. Reference may be made in this respect to German laid-open application (DE-OS) no. 27 37 524 disclosing a suitable method of taking account of the above-mentioned dimensions and parameters in the position detection device 5.

In the event that a balancing mode as shown in FIG. 2C is to be used, it is possible to provide for appropriate sensing of the balancing planes E1 and E2. The corresponding positions of the sensing lever 2 are detected by the position detection device 5 and proportional signals in digital form are generated and input to storage device 6. Those data which specify the positions of the balancing planes E1 and E2, as well as the radii of the positions of the balancing weights in the balancing planes E1 and E2, are also taken into consideration in the course of the operation of evaluating the measuring sensor signals supplied during the unbalance measuring operation by the measuring sensors (not shown) in the electronic measuring and evaluation apparatus 15.

When dealing with standard wheels with steel rims, for example, the rim sensing procedure shown in FIG. 3(B) is used. When dealing with standard wheels with alloy rims, the wheel rim sensing procedure shown in FIG. 3(C) can be used. When dealing with shallow-bed or deep-bed rims, for example, the sensing procedure shown in FIG. 3(D) can be employed. When dealing with steel rims on steep-shoulder wheels, the sensing procedure shown in FIG. 3(E) can be used.

It will be noted that the sensing procedures shown in FIGS. 3(B) through (E) are the sensing procedures involved in the left-hand balancing planes E1. The position of the right-hand balancing plane can be obtained from the position of the left-hand balancing plane by means of a rim width sensor which is associated with the balancing machine as an accessory part thereof.

It will also be noted here that the balancing weight which is used for sensing the rim in FIG. 3(A) can be an adhesive weight which is applied, with the protective foil covering the adhesive layer facing upwardly, to the support surface 13 of the sensing lever 2. The sensing tip 3 with the inserted balancing weight 1 is held in the sensing position for a certain period of time, for example, two seconds, in order to give sufficient time for the recorded measurement values to be passed into the storage means 6.

If certain balancing modes involve predetermined positioning of the balancing weights in given planes on the rim of the wheel to be balanced, that can further facilitate the operation of sensing the rim dimensions, from the point of view of the machine operator.

Reference can now be made to FIG. 2, which shows a number of different balancing modes for standard rims.

FIG. 2(A) shows normal weight positioning on the rim flange or bead portions. The weights involved are generally spring-type weights which are clamped into the rim flange or bead portions.

FIG. 2(B) shows the symmetrical fitment or attachment of adhesive weights to rim shoulders.

FIG. 2(C) shows the fitment of adhesive weights, with a concealed weight being mounted in the rim dish portion in order not to be detrimental to the attractive appearance of the vehicle wheel, more particularly an alloy wheel.

In the case of the balancing mode shown in FIG. 2(D), a spring-type weight is attached to the left-hand rim flange or bead portion while an adhesive weight is fitted in the rim dish.

In the balancing mode shown in FIG. 2(E), a spring-type weight is attached to the left-hand rim flange or bead portion while an adhesive weight is attached to the right-hand rim shoulder.

In the balancing mode shown in FIG. 2(F), a spring-type weight is attached to the right-hand rim flange or bead portion and an adhesive weight is placed on the left-hand rim shoulder.

The above-indicated possible balancing modes, which can be used for suitable positioning of the respective balancing weights, can be displayed at the display unit indicated at 8 in FIG. 1. This can be done by reproduction of the rim symbols shown in FIG. 2, with the balancing planes E1 and E2 identified by diagrammatically illustrated balancing weights. The various balancing modes or weight positions as indicated in FIGS. 2(A) through (F) can be displayed separately. The balancing planes E1 and E2 which are to be sensed by means of the sensing lever 2 can then be identified by visual identification, for example by flashing of the weight symbols which specify the positions of the balancing planes E1 and E2. The operator then knows what locations on the rim of the wheel to be balanced are to be sensed with the sensing lever. The display unit 8 preferably flashes one weight symbol which indicates the balancing plane to be sensed on the vehicle wheel. When that balancing plane has been sensed and the corresponding data stored in the storage means 6, the weight symbol in respect of the second balancing plane then flashes.

The above-indicated mode of operation, as described with reference to FIG. 2, is brought into effect by operating a switch as indicated at 9 in FIG. 1. Switch 9 is closed and causes flashing of the appropriate weight symbol, when the sensing lever 2 is moved out of its rest position.

Reference will now be made to FIG. 4 to describe the mode of operation involved in retrieval of the balancing planes E1 and E2 which had been previously ascertained in the sensing mode, this phase of operation being referred to as the retrieval mode. Reference will be made to the balancing mode shown in FIG. 2(C) for the purposes of this description.

A balancing weight, which could be in the form of an adhesive weight, is fixed to the sensing lever 2 by means of the spring-loaded holding device 4 between the gripping claw and the upwardly bent sensing tip. The protective foil 14, which covers the layer of adhesive on the top of the balancing weight 1, is removed as shown in FIG. 4(A). The sensing tip 3 is moved to the rim 12, the spacing of the sensing lever 2 from the respective balancing plane E1 or E2 being displayed at the display unit 8. As soon as the balancing weight 1 or the center of gravity S thereof is moved into one of the two planes, for example the left-hand balancing plane E1 as illustrated, a signal is given, such as an acoustic signal, to indicate to the operator that the weight has been moved into the appropriate balancing plane. At the same time a spacing display zero is shown on the display, corresponding to the position shown in FIG. 4(B).

The adhesive weight 1 is then moved towards the rim 12 and pressed thereagainst by the weight holding device 4. The sensing lever 2 is released from the balancing weight 1 which now adheres to the rim 12, and moved back into its starting position.

In the starting position of the sensing lever 2, a second balancing weight 1 is fixed to the sensing lever 2 by means of the holding device 4, and the same procedures as that described above is repeated for fitting the balancing weight 1 in the right-hand balancing plane E2 shown in FIG. 4(C). As can be seen from FIGS. 4(B) and (C), the balancing weights 1 are fixed to the rim 12 in positions such that their centers of gravity S are disposed in the previously detected balancing planes E1 and E2.

A switch, as indicated at 16 in FIG. 1, can be actuated for initiating the retrieval mode in respect of the respective balancing plane, in the balancing procedure. Switch 16 can be actuated manually or alternatively automatically by means of a procedure program or by a given control movement of the sensing lever 2.

FIG. 5 shows a clamping device for locking the sensing lever 2 in a respectively set extended position. The clamping device comprises a clamping screw 18 which is screwed into the side wall of an extension tube 19 of the sensing lever 2. The clamping screw 18 is disposed in the vicinity of the end which is adjacent the pivot point of the sensing lever 2 for pivotal movement thereof in the direction indicated by the arrow 11 in FIG. 1. That arrangement provides that the sensing lever 2 can be fixed by a clamping action in practically all positions within the range of extension and retraction movement of the sensing lever 2. For extension of the sensing lever 2, the extension tube 19 is guided on a guide bar 20 which is pivotable about the above-mentioned pivot axis of the sensing lever 2. Upon actuation of the clamping screw 18, the clamping screw is moved inwardly relative to the extension tube 19 and comes into clamping engagement with the guide bar 20 so that extension of the tube 19 relative to the guide bar 20 is blocked.

FIG. 6 shows a sensing device for sensing the dimensions of the balancing weight 1 in the extension direction. A balancing weight 1 is shown clamped between the sensing tip 3 and holding device 4 by the force of spring 17. A fixing pin 22 is fixed to the holding device 4 which is displaceable in the extension tube 19 in the axial direction thereof. Fixed to the pin 22 is a cord 21 or a pull wire which is connected to a potentiometer (not shown) for ascertaining the extension length in the position detection device 5. If the axial dimensions of the balancing weight 1 change, the center of gravity S is also correspondingly displaced. That phenomenon can be taken into consideration by virtue of the illustrated sensing device. In that situation, the respective displacement of the center of gravity S is half the respective variation in dimension as between the holding device 4 and the sensing tip 3.

It will be noted that, in the embodiment illustrated in FIG. 6, the pin 22 is rigidly connected to the holding device 4. It is, however, also possible for the pin 22 to be in the form of a lever which is correspondingly pivoted in dependence on the dimension of the balancing weight 1. That pivotal movement is then also transmitted to the cord or wire 21. In that arrangement, the transmission ratio of the lever assembly can be so selected that the above-mentioned displacement of the center of gravity, which corresponds to half the respective variation in dimension in the axial direction, is taken into account mechanically. When the device has a rigid pin, as illustrated in FIG. 6, that aspect can be taken into consideration by means of a suitable computing operation in the electronic evaluation apparatus or in the position detection device 5.

It will be appreciated that the above-described unbalance correction method and apparatus according to the present invention have been set forth solely by way of example and illustration of the principles of the invention and that various modifications and alterations may be made therein without thereby departing from the spirit and scope of the invention.

What is claimed is:

1. A method of correcting unbalance on a motor vehicle wheel by means of at least one balancing weight securable to a portion of the wheel in an unbalance correcting position thereon, including the steps of:

performing an unbalance measuring procedure using an electronic measuring means for ascertaining the unbalance correcting position at which the at least one balancing weight is to be secured to the wheel, and performing an unbalance correcting procedure by arranging the at least one balancing weight at the unbalance correcting position on the wheel, whereby a sensing means is used, which is coupled to the electronic measuring means and which senses at least one wheel dimension for storage thereof in the electronic measuring means, for comparative evaluation of measurement values obtained in the unbalance measuring procedure to ensure that the at least one balancing weight is positioned at the unbalanced correcting position during the unbalanced correcting procedure.

2. A method as set forth in claim 1 wherein the step of performing the unbalance procedure includes using the sensor means to ascertain a balancing plane in which the at least one balancing weight for unbalance correction is fitted and a corresponding balancing plane position is stored in said electronic measuring means, and wherein the step of performing the unbalance correcting procedure includes retrieval of the the balancing plane position prior to positioning the at least one balancing weight to the wheel by moving the sensing means, and wherein a spacing of the sensing means from the balancing plane position is indicated.

3. A method as set forth in claim 2 wherein during said unbalance correcting procedure a signal is produced by said electronic measuring means upon retrieval of the balancing plane position in which the at least one balancing weight is to be fitted.

4. A method as set forth in claim 1 wherein, said sensing means determines a balancing plane, and a diameter of the at least one balancing weight fitted to the wheel for measurement value evaluation by sensing the at least one wheel dimension including an inside dimension of the wheel in the balancing plane with the at least one balancing weight arranged between the sensing means and said inside dimension.

5. A method as set forth in claim 1 further comprising the step of displaying a wheel rim cross-section with a plurality of possible balancing planes by a display device connected to the electronic measuring means, wherein a balancing plane of said plurality of possible balancing planes which is intended for use in the unbalance correcting procedure is displayed by a signal generated during a sensing operation performed by said sensing means and wherein after sensing of the balancing plane on the wheel to be measured, the display is terminated.

6. A method as set forth in claim 5 wherein the displaying step for displaying the balancing plane to be sensed on the wheel begins when the sensing means is moved out of a rest position thereof.

7. A method as set forth in claim 5 wherein during the displaying step, first and second balancing planes to be sensed are displayed in succession for carrying out a dynamic unbalance correcting procedure.

8. A method as set forth in claim 1 further comprising the step of fixing the sensing means in a sensing position.

9. A method as set forth in claim 8 wherein the sensing means is fixed manually.

10. A method as set forth in claim 8 wherein the sensing means is fixed under the control of the electronic measuring means.

11. A method as set forth in claim 8 wherein when the sensing means is fixed the wheel is turned into the angular position for unbalance correction.

12. A method as set forth in claim 1 which further includes the step of switching over between a balancing plane sensing mode and a retrieval mode of operation.

13. A method as set forth in claim 12 wherein both in said sensing mode and in said retrieval mode a balancing weight is fitted into the sensing means and a position of the balancing weight center of gravity which is effective in the unbalance correcting procedure is used in the operation of sensing and retrieving a balancing plane defining the unbalance correcting position.

14. A system for correcting unbalance of a wheel by use of balancing weight to be fixed at a balancing position on the wheel comprising:

sensing means for sensing a wheel portion at which at least one balancing weight is to be fixed to the wheel;

position detecting means co-operable with said sensing means for detecting and generating data corresponding to at least one position at which said at least one balancing weight is to be fixed to the wheel;

storage means connected to the position detecting means for storing such position data;

comparison means operatively connected to said storage means and to said position detecting means for comparing the stored position data with a current position data of said at least one balancing weight; and means connected to the output of said comparison means for signalling when the stored position data corresponds with the current position data.

* * * * *

UNITED STATES PATENT AND TRADEMARK OFFICE
CERTIFICATE OF CORRECTION

PATENT NO.   :   5,471,874
DATED        :   December 5, 1995
INVENTOR(S)  :   RATHAMEL et al.

It is certified that error appears in the above-identified patent and that said Letters Patent is hereby corrected as shown below:

Col, 11, lines 28 and 29, change "unbalanced" to --unbalance--.

Signed and Sealed this

Fourth Day of June, 1996

Attest:

BRUCE LEHMAN

Attesting Officer

Commissioner of Patents and Trademarks